(12) United States Patent
Chao et al.

(10) Patent No.: US 9,006,921 B2
(45) Date of Patent: *Apr. 14, 2015

(54) ENERGY STORAGE SYSTEM AND RELATED METHOD

(75) Inventors: Emil Yuming Chao, Laguna Hills, CA (US); Charles Chang, Coto De Caza, CA (US); Oleg Khaykin, Manhattan Beach, CA (US)

(73) Assignee: International Rectifier Corporation, El Segundo, CA (US)

( * ) Notice: Subject to any disclaimer, the term of this patent is extended or adjusted under 35 U.S.C. 154(b) by 683 days.

This patent is subject to a terminal disclaimer.

(21) Appl. No.: 13/194,073

(22) Filed: Jul. 29, 2011

(65) Prior Publication Data

US 2013/0026822 A1 Jan. 31, 2013

(51) Int. Cl.
*H02G 3/00* (2006.01)
*B60L 11/18* (2006.01)
*H02J 1/10* (2006.01)
*H02J 1/14* (2006.01)
*H02J 7/34* (2006.01)

(52) U.S. Cl.
CPC ......... *B60L 11/1853* (2013.01); *B60L 11/1868* (2013.01); *H02J 1/108* (2013.01); *H02J 1/14* (2013.01); *H02J 7/34* (2013.01); *Y02T 10/7005* (2013.01); *Y02T 10/7066* (2013.01); *Y02T 10/92* (2013.01)

(58) Field of Classification Search
USPC .......................................................... 307/9.1
See application file for complete search history.

(56) References Cited

U.S. PATENT DOCUMENTS

| 8,742,722 B2* | 6/2014 | Chang ........................... 320/119 |
| 2009/0309422 A1* | 12/2009 | Helmick ......................... 307/53 |
| 2012/0319657 A1* | 12/2012 | Ke et al. ........................ 320/134 |

* cited by examiner

*Primary Examiner* — Robert L. Deberadinis
(74) *Attorney, Agent, or Firm* — Farjami & Farjami LLP

(57) ABSTRACT

Disclosed herein is an energy storage system and related method. According to one embodiment, such a system comprises a power management system and a plurality of energy banks coupled to the power management system, wherein each of the plurality of energy banks is capable of being independently discharged through the power management system. The power management system is configured to select at least one of the plurality of energy banks to transfer energy between the energy storage system and a machine powered using the energy storage system. According to one embodiment, the method comprises determining an energy transfer requirement of the machine powered by the energy storage system, selecting at least one of the plurality of energy banks for responding to the energy transfer requirement, and transferring energy between the selected energy bank(s) and the machine according to the energy transfer requirement.

20 Claims, 6 Drawing Sheets

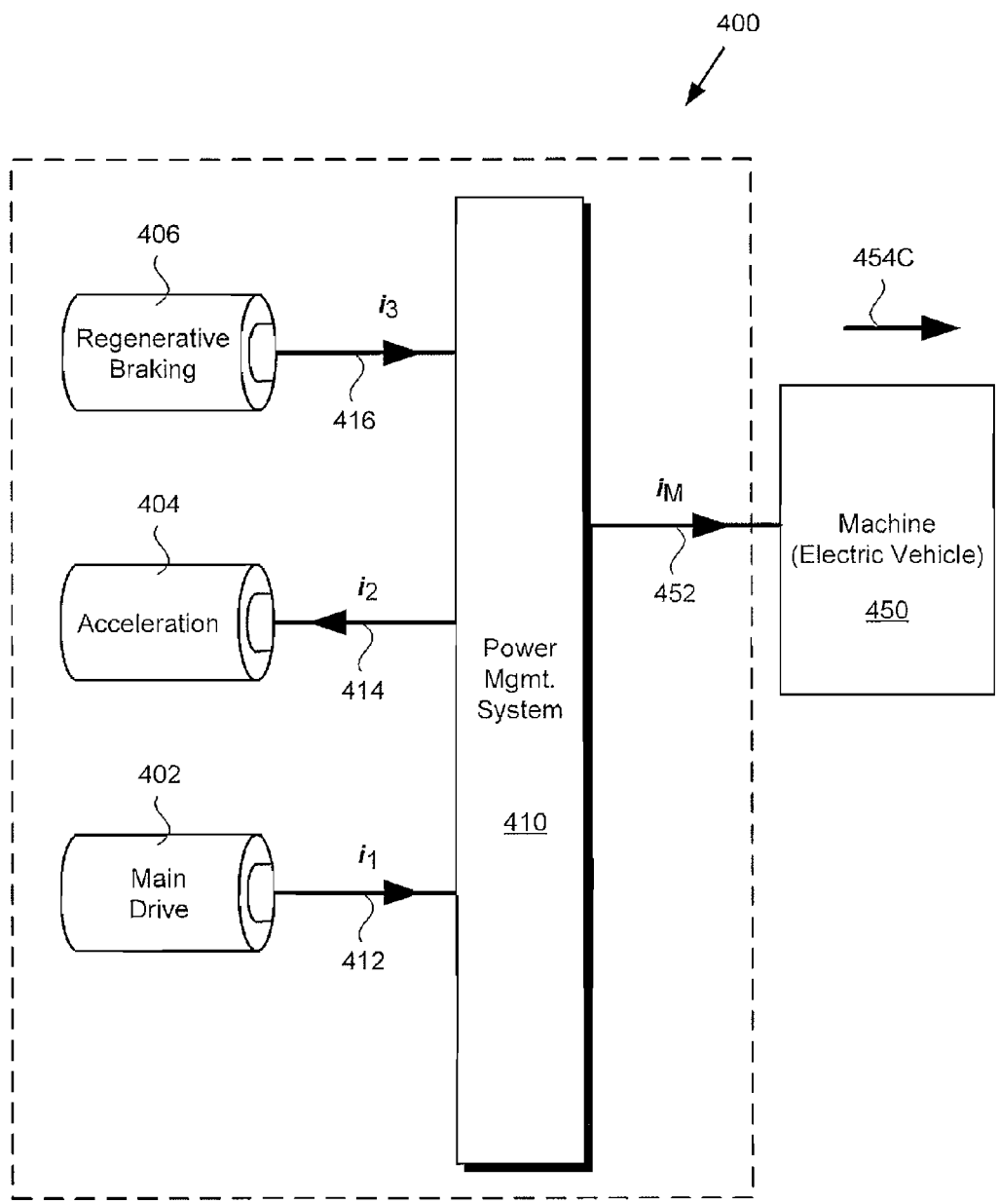

ENERGY STORAGE SYSTEM AND RELATED METHOD

BACKGROUND OF THE INVENTION

1. Field of the Invention

The present invention is generally in the field of electrical circuits and systems. More specifically, the present invention is in the field of energy storage circuits and systems.

2. Background Art

The storage and on-demand delivery of electrical energy is increasingly important as the transition from fossil fuels to renewable and other so called "green" energy alternatives continues. Electric vehicles and gas/electric hybrid automobiles, for example, typically utilize a battery pack of secondary battery cells that are alternately discharged and charged as the vehicle is operated, and that may be fully recharged when the vehicle is not in use. Such secondary battery packs may constitute a substantial portion of the cost of an electric or gas/electric hybrid vehicle, and the performance of the vehicle battery pack, and in particular its longevity, may significantly influence consumer willingness to invest in the initially costlier vehicle purchase price.

Conventional battery based power systems, such as the secondary battery packs used in electric and gas/electric hybrid vehicles, for example, usually comprise a collection of secondary battery cells that are nominally identical, e.g., battery cells sharing the same chemistry and providing substantially the same cell voltage, connected in series in order to provide the relatively high voltages required for vehicle operation, e.g., several hundred volts. As a result, the type of secondary battery cell conventionally selected for use often represents a compromise among several competing factors. For example, although a battery pack may be called upon for heavy power discharge during vehicle acceleration, for sustained power discharge during normal driving, and for rapid power uptake during regenerative braking, no single secondary battery cell type may provide optimum performance for all three operations. Moreover, considerations such as battery pack cost, weight, and anticipated longevity must also be taken into account when selecting the type of secondary battery best suited for use.

In addition to representing a compromise that is likely to be less than optimal for any one of multiple performance objectives, the conventional approach to powering vehicles electrically may prematurely reduce the usable life of the battery pack. For example, as mentioned above, the conventional approach to providing electric power to a vehicle may use the same battery pack as a power source for acceleration and as a power storage reservoir during energy regenerating operations, such as regenerative braking. However, because operation of a vehicle is typically a highly dynamic process, acceleration and braking can be expected to alternate often, resulting in frequent charge cycling of the battery pack, thereby undesirably shortening battery life.

Thus, there is a need to overcome the drawbacks and deficiencies in the art by providing an electric energy storage system capable of providing substantially optimized power transfer in response to a broad spectrum of performance requirements, while also advantageously improving battery or other energy storage cell longevity.

SUMMARY OF THE INVENTION

A energy storage system and related method, substantially as shown in and/or described in connection with at least one of the figures, and as set forth more completely in the claims.

BRIEF DESCRIPTION OF THE DRAWINGS

FIG. 4C shows a specific example of energy storage and power management during sustained operation of an electric vehicle, according to one embodiment of the present invention.

DETAILED DESCRIPTION OF THE INVENTION

Figure 1:
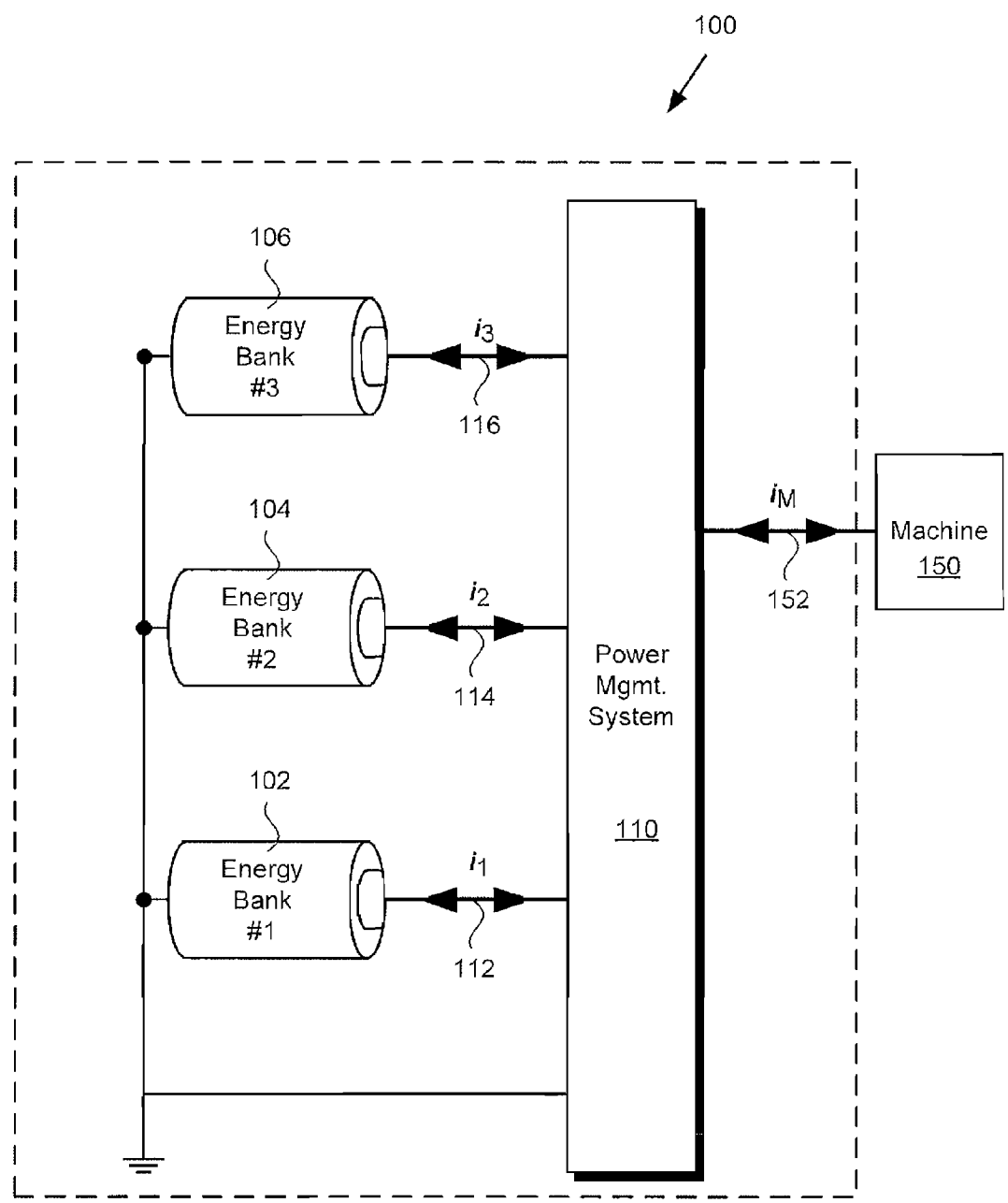
FIG. 1 is a block diagram showing selected features of an energy storage system, according to one embodiment of the present invention.

The present invention is directed to a energy storage system and related method. Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely example embodiments of the invention. To maintain brevity, other embodiments of the invention, which use the principles of the present invention, are not specifically described in the present application and are not specifically illustrated by the present drawings. It should be borne in mind that, unless noted otherwise, like or corresponding elements among the figures may be indicated by like or corresponding reference numerals.

FIG. 1 is a block diagram showing selected features of energy storage system 100, according to one embodiment of the present invention. As shown in FIG. 1, energy storage system 100 comprises power management system 110, shown in the present embodiment as a bi-directional power management system, together with first energy bank 102, second energy bank 104, and third energy bank 106, all coupled to power management system 110. As further shown in FIG. 1, energy storage system 100 is implemented to power machine 150. In addition, FIG. 1 shows currents $i_1$, $i_2$, and $i_3$, flowing between respective first, second, and third energy banks 102, 104, and 106, and power management system 110, along respective energy transfer paths 112, 114, and 116, as well as machine current $i_M$ sourced to or sunk from machine 150 by energy storage system 100 through power management system 110 along energy transfer path 152.

According to the present embodiment, energy banks 102, 104, and 106 are shown as secondary, e.g., rechargeable, energy banks coupled to power management system 110 in parallel. In such a configuration, it is to be understood that energy banks 102, 104, and 106 are capable of being independently charged and/or discharged through power management system 110. That is to say, one of energy banks 102, 104, and 106 is capable of being discharged while one or more others of energy banks 102, 104, and 106 are concurrently or substantially concurrently discharged, charged, or not in use, e.g., neither being charged nor discharged.

By way of example, in one embodiment, energy storage system 100 may be implemented using nominally identical secondary battery packs as first, second and third energy banks 102, 104, and 106. For instance, each of energy banks 102, 104 may comprise lithium-ion type battery cells each providing a voltage of approximately 3.3 volts. Each of energy banks 102, 104, and 106 may include many such individual battery cells, such as one-hundred cells, for example, connected in series so as to supply several hundred volts. Alternatively, in one embodiment energy banks 102, 104, and 106 may each comprise secondary batteries having distinct chemistries, or implementing different energy storage technologies. For example, first energy bank 102 may comprise lithium-ion secondary battery cells, while second energy bank 104 comprises nickel-metal hydride battery cells each supplying a lower nominal voltage. Moreover, in some embodiments, one or more of energy banks 102, 104, and 106 may be implemented using supercapacitors or fuel cells, for example.

According to various embodiments of the present invention, bi-directional power management system 110 can be configured to determine an energy transfer requirement of machine 150, and to select at least one of energy banks 102, 104, and 106 to transfer power between energy storage system 100 and machine 150 according to that requirement. For example, power management system 110 may determine an energy transfer requirement of machine 150 according to a required rate of energy transfer, i.e., power requirement, an anticipated duration of power transfer, and/or the direction of required energy transfer. As a specific example, where machine 150 is configured to regenerate energy as well as to consume energy during its operation, one of energy banks 102, 104, and 106 may be more often selected to receive regenerative power from machine 150, while one or both others of energy banks 102, 104, and 106 may be more often selected for discharge to machine 150.

It is noted that although the present embodiment refers to "a machine" in the singular, it is understood that in some embodiments machine 150 may actually comprise multiple machines, either configured to work together or to operate independently of one another, and powered using energy storage system 100. Moreover, although the embodiments specifically described herein refer to power transfer between machine 150 and energy storage system 100, in embodiments in which machine 150 corresponds to multiple machines, the present inventive concepts can also be implemented to mediate energy transfer between the machines. For example, in one embodiment, machine 150 may correspond to two machines, e.g., an electrical vehicle and a power system such as a utility power grid or a power generation system. In that embodiment, energy storage system 100 can be implemented to manage power transfer between the electrical vehicle and the utility power grid or power generation system.

It is also noted that although the various specific embodiments presented herein will represent energy banks such as first, second, and third energy banks 102, 104, and 106 as comprising secondary energy storage unit cells, for the purposes of more fully illustrating the present inventive concepts, that characterization should not be interpreted as limiting. For instance, energy storage system 100 may include more, or fewer, energy banks than the three energy banks shown in FIG. 1. Moreover, although energy banks 102, 104, and 106 will typically be characterized as comprising secondary energy cells capable of being charged as well as discharged, in one embodiment, one or more of energy banks 102, 104, and 106 may comprise primary energy cells for which discharge only is permitted by power management system 110. Furthermore, as alluded to above, in other embodiments, first, second, and third energy banks 102, 104, and 106 can comprise any suitable energy storage units, such as a rechargeable automotive or industrial batteries, supercapacitors, fuel cells, photovoltaic cells, or power grid energy storage batteries, for example.

As used herein, the feature "energy bank" may comprise a single energy cell, several energy cells connected in series and managed in common, several energy cells connected in parallel and managed in common, or any suitable combination of those arrangements. It is further noted that because in one embodiment, energy banks 102, 104, and 106 can comprise individual energy cells of the same nominal type, in that embodiment, energy banks 102, 104, and 106 can be thought of as parallel partitions of a single energy cell type.

Energy banks having different chemistries or implemented using different energy storage technologies may variously better lend themselves to different performance requirements. For example, an energy bank of one type may be particularly well suited to deliver or to absorb energy rapidly, while an energy bank of another type may be a better choice for lower sustained energy discharge requirements due to its lighter weight and/or lower cost. By configuring an energy storage system to include a plurality of such energy banks capable of being operable independently, the present inventive concepts enable implementation of a power system that can be rendered more responsive to the performance requirements of the load it supplies. In addition, by enabling the selective use of one of a plurality of independently operable energy banks for periodic consistent recharge of energy regenerated by a load, while one or more other energy cells are consistently selected for discharge to the load, the present inventive concepts provide an energy storage system designed to avoid the frequent charge cycling contributing to premature battery failure in conventional systems.

Figure 2:
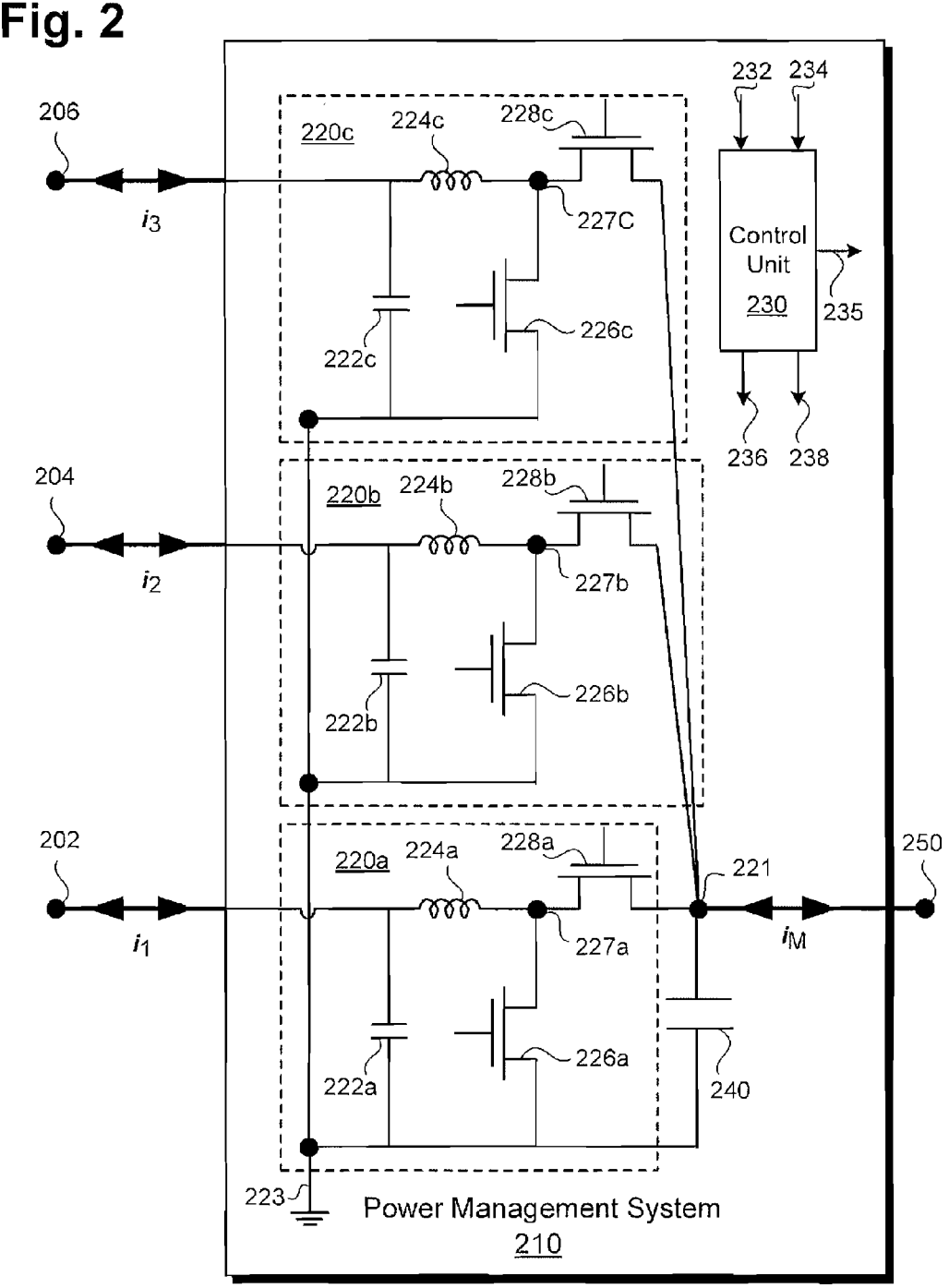
FIG. 2 is a diagram showing a more detailed representation of a power management system for use in an energy storage system, according to one embodiment of the present invention.

Turning to FIG. 2, FIG. 2 is a diagram showing a more detailed representation of power management system 210 for use in an energy storage system, according to one embodiment of the present invention capable of overcoming the drawbacks and deficiencies associated with the conventional art. Power management system 210 is shown by FIG. 2 to be a bi-directional system configured to source or sink currents $i_1$, $i_2$, $i_3$, and $i_M$ to/from respective nodes 202, 204, 206, and 250. Bi-directional power management system 210 and nodes 202, 204, 206, and 250 correspond respectively to bi-directional power management system 110, energy banks 102, 104, and 106, and machine 150, in FIG. 1. As shown in FIG. 2, each of nodes 202, 204, and 206 is associated with a corresponding power transfer unit, e.g., respective power transfer units 220a, 220b, and 220c (hereinafter "power transfer units 220a-220c").

As further shown in FIG. 2, bi-directional power management system 210 may also comprise storage capacitor 240 coupled between reference node 221 of power management system 210 and ground 233. Storage capacitor 240 may serve as a temporary charge storage node for bi-directional power management system 210, and in that capacity helps to enable the transfer or redistribution of energy among the energy cells corresponding to nodes 202, 204, and 206. FIG. 2 also shows control unit 230 of bi-directional power management system 210. Control unit 230 is shown to include inputs 232 and 234 for receiving system commands and sensory and/or environmental inputs, as well as output 235 for communicating with systems or components external to power management system 210. Control unit 230 may be used to maintain storage capacitor 240 at a desired operating voltage, or within a desired operating voltage range, for example, as well as to provide control signals from outputs 236 and 238 for controlling independently operable power transfer units 220a-220c.

Power transfer unit 220a may include capacitor 222a, inductor 224a, low side switch 226a, and high side switch 228a. As shown in FIG. 2, low side switch 226a and high side switch 228a are arranged in a half bridge configuration having switching node 227a coupled to node 202 through inductor 224a. Similarly, each of power transfer units 220b and 220c may include respective capacitors 222b and 222c, inductors 224b and 224c, as well as low side switches 226b and 226c and high side switches 228b and 228c arranged in half bridge configurations having respective switching nodes 227b and 227c.

As may be seen from FIG. 2, corresponding terminals of low side switches 226a, 226b, and 226c, are directly connected to ground 223, which in the embodiment of FIG. 2 serves as a common ground for power transfer units 220a, 220b, and 220c, as well as for storage capacitor 240. In addition, FIG. 2 shows that corresponding terminals of high side switches 228a, 228b, and 228c are directly connected to reference node 221. Moreover, according to the example implementation of FIG. 2, storage capacitor 240, which may be pre-charged, for example, can be utilized as a power supply for one or more of high side switches 228a, 228b, and 228c during operation of power management system 210.

Figure 3:
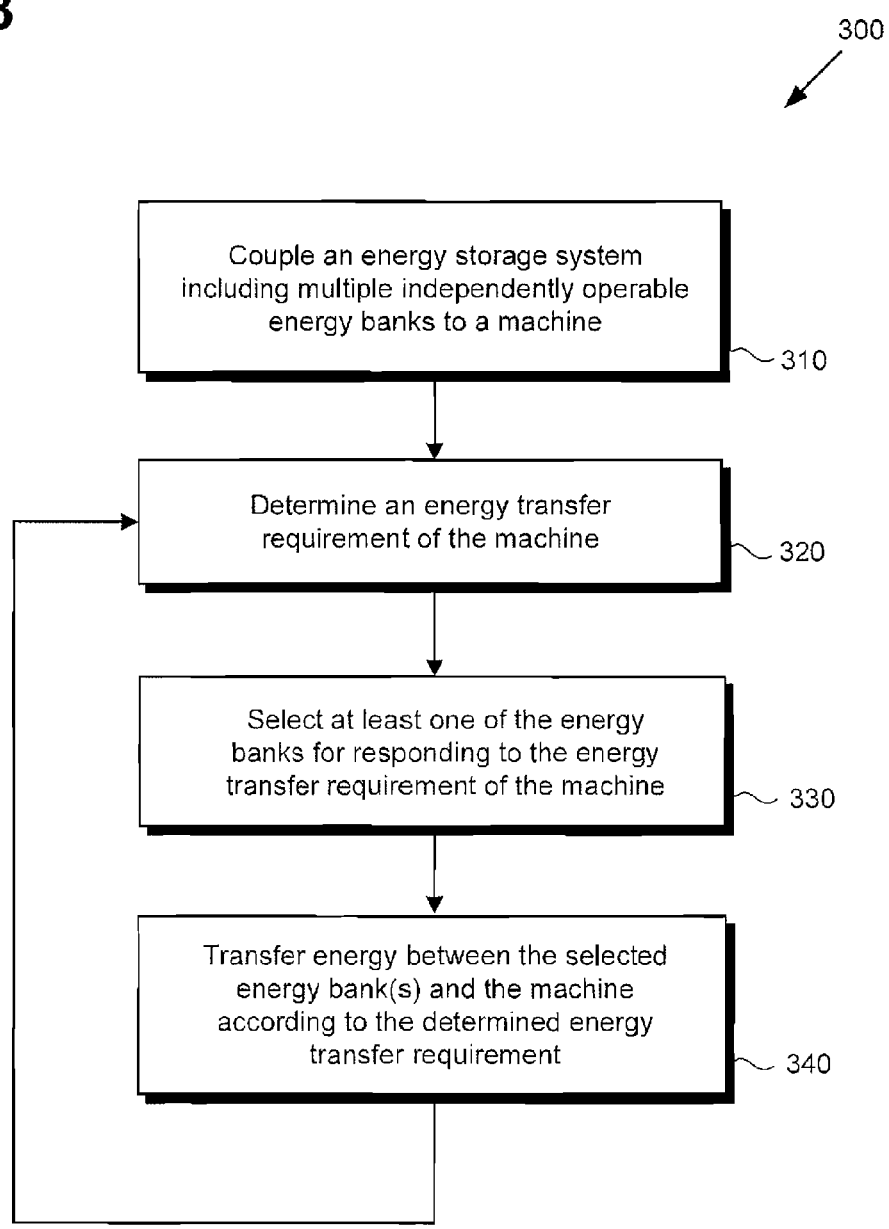
FIG. 3 shows a flowchart presenting a method for managing energy storage, according to one embodiment of the present invention.
Figure 4A:
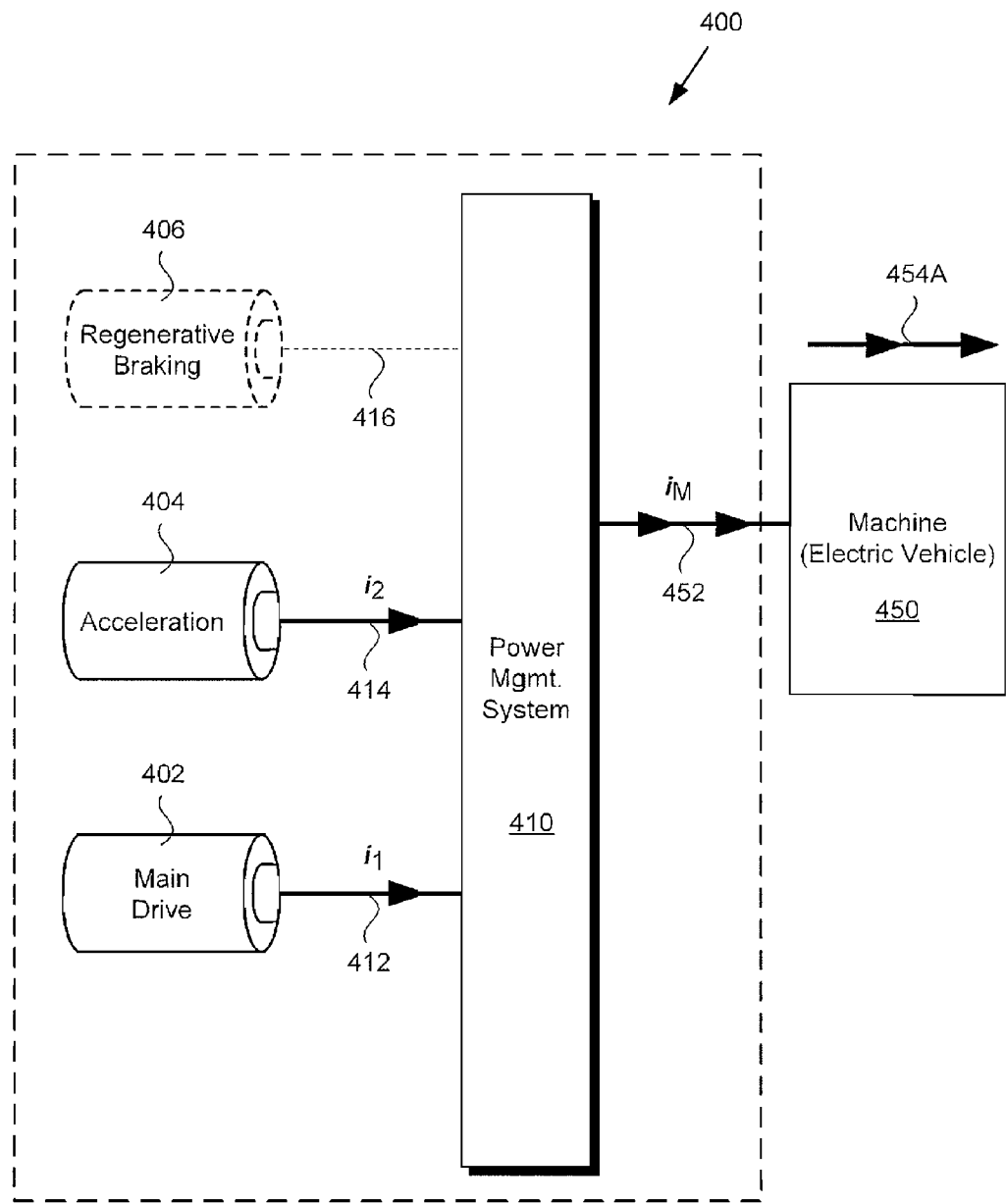
FIG. 4A shows a specific example of energy storage and power management during acceleration of an electric vehicle, according to one embodiment of the present invention.
Figure 4B:
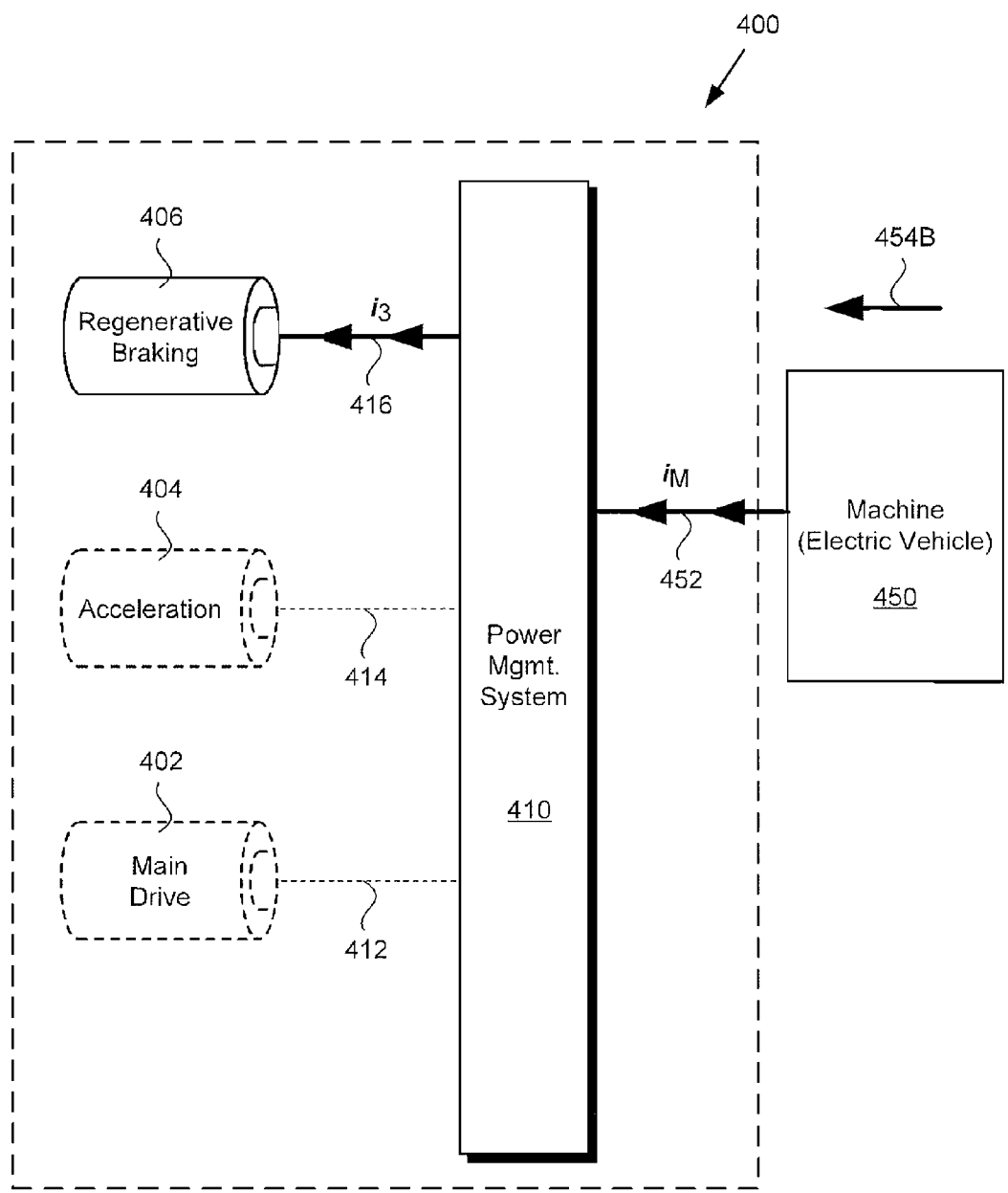
FIG. 4B shows a specific example of energy storage and power management during regenerative braking of an electric vehicle, according to one embodiment of the present invention.

The operation of energy storage system 100, in FIG. 1, and power management system 210, in FIG. 2, will now be further described in combination with FIG. 3, as well as FIGS. 4A, 4B, and 4C (hereinafter "FIGS. 4A-4C"). FIG. 3 shows a flowchart presenting a method for use by an energy storage system for selectively utilizing a plurality of energy banks, such as secondary battery packs, supercapacitors, fuel cells, and the like, according to one embodiment of the present invention. FIG. 4A is a block diagram showing a specific example of energy storage and power management during acceleration of an electric vehicle, while FIG. 4B shows a specific example of battery energy storage and power management during regenerative braking of an electric vehicle, according to one embodiment of the present invention. In addition, FIG. 4C shows a specific example of energy storage and power management during sustained driving of an electric vehicle, according to one embodiment of the present invention.

Referring first to FIGS. 4A-4C, each of those figures shows energy storage system 400 powering machine 450, represented as an electric vehicle in the present embodiment, in response to a variety of power transfer requirements corresponding respectively to acceleration, regenerative braking, and sustained normal driving, e.g., sustained cruising, by electric vehicle 450. It is noted that the representation of machine 450 as electric vehicle 450 is provided merely as an illustrative example, and is not to be interpreted as a limitation. In other embodiments, machine 450 may correspond to another type of vehicle, such as a gas/electric hybrid automobile or other type of vehicle, or an industrial tool or mechanical system, for example. Alternatively, in still other embodiments, energy storage system 400 may be implemented in combination with a power utility infrastructure, for example, as part of a power grid, or a power generation system such as a wind farm, or solar farm.

As shown in FIGS. 4A-4C, energy storage system 400 comprises power management system 410 and main drive energy bank 402, acceleration energy bank 404, and regenerative braking energy bank 406, all coupled to power management system 410 so as to be independently operable. Energy storage system 400 comprising power management system 410, main drive energy bank 402, acceleration energy bank 404, and regenerative braking energy bank 406, corresponds to energy storage system 100 comprising power management system 110 and first, second, and third energy banks 102, 104, and 106, in FIG. 1. Furthermore, power management system 410 in FIGS. 4A-4C may be seen to correspond to power management system 210, in FIG. 2. Also shown in FIGS. 4A-4C are currents $i_1$, $i_2$, $i_3$, and $i_M$, flowing along respective energy transfer paths 412, 414, 416, and 452, corresponding respectively to currents $i_1$, $i_2$, $i_3$, and $i_M$, flowing along respective energy transfer paths 112, 114, 116, and 152, in FIG. 1.

With respect to FIG. 3, FIG. 3 presents flowchart 300 describing a method for managing energy storage by selectively utilizing a plurality of energy banks, such as main drive energy bank 402, acceleration energy bank 404, and regenerative braking energy bank 406, in FIGS. 4A-4C, according to one embodiment of the present invention. Certain details and features have been left out of flowchart 300, in FIG. 3, that are apparent to a person of ordinary skill in the art. For example, a step may comprise one or more substeps or may involve specialized equipment or materials, as known in the art. While steps 310 through 340 indicated in flowchart 300 are sufficient to describe one embodiment of the present invention, other embodiments of the invention may utilize steps different from those shown in flowchart 300, or may comprise more, or fewer, steps.

Referring first to step 310 in FIG. 3, step 310 of flowchart 300 comprises coupling a energy storage system including multiple independently operable energy banks to a machine. Step 310 corresponds to each of the situations depicted in FIGS. 4A-4C, in which energy storage system 400 including main drive energy bank 402, acceleration energy bank 404, and regenerative braking energy bank 406 is coupled to electric vehicle 450 so as to power electric vehicle 450 in response to a variety of performance requirements, e.g., acceleration, regenerative braking, and sustained cruising, respectively.

Continuing with step 320 in FIG. 3, and continuing to refer to FIGS. 4A-4C, step 320 of flowchart 300 comprises determining an energy transfer requirement of electric vehicle 450. Step 320 may be performed by energy storage system 400 in any of a number of ways. For example, energy storage system 400 may receive data corresponding to an energy transfer requirement from one or more sensors internal to energy storage system 400, or included in or on electric vehicle 450 (sensors not shown in FIGS. 4A-4C). Alternatively, energy storage system 400 may be configured to communicate with a central controller of electric vehicle 450 (central controller of vehicle 450 also not shown in FIGS. 4A-4C) and thereby monitor the operating state and/or driver inputs to electric vehicle 450.

As represented by FIGS. 4A-4C, determining an energy transfer requirement by energy storage system 400 may correspond to determining any or several of a rate of energy transfer, a duration of energy transfer, and a direction of energy transfer, for example. For instance, FIG. 4A shows electric vehicle 450 undergoing acceleration 454A. In order to power that performance, FIG. 4A shows that energy storage system 400 has determined that an increased rate of energy transfer is required during acceleration 454A. Alternatively, in some embodiments, energy storage system 400 may be configured to determine a duration of energy transfer between energy storage system 400 and electric vehicle 450. For example, activation of a cruise control feature by the driver of electric vehicle 450 may result in energy storage system 400 extending a duration of power transfer to electric vehicle 450 in response to its anticipated sustained driving operation.

Although not specifically shown in FIGS. 4A-4C, as explained above, in other embodiments of the present invention, machine 450 may be included in a power system, for example, a power grid or a power generation system such as a wind farm or solar farm. In those embodiments, an increased rate of energy transfer may correspond to increases in demand by the power system, such as demand peaks or spikes, for example.

Moving to step 330 in FIG. 3, step 330 of flowchart 300 comprises selecting at least one of main drive energy bank 402, acceleration energy bank 404, and regenerative braking energy bank 406 for responding to the energy transfer requirement determined by energy storage system 400 in step 320. Referring, for example, to FIG. 2, step 330 may be performed using control unit 230 of power management system 210 to provide control signals through outputs 236 and 238. It is noted that output 236 corresponds to a plurality of independent control signals being provided respectively to low side switches 226a, 226b, and 226c, whereas output 238 similarly corresponds to a plurality of independent control signals being provided respectively to high side switches 228a, 228b, and 228c. As a result, power transfer units 220a-220c may be selectively utilized to enable energy transfer from energy storage system 400 to electric vehicle 450, as shown in FIG. 4A, from electric vehicle 450 to energy storage system 400, as shown in FIG. 4B, or between the energy banks internal to energy storage system 400, as shown in FIG. 4C.

Continuing to step 340 in FIG. 3 with ongoing reference to FIGS. 4A-4C, step 340 of flowchart 300 comprises transferring energy between the energy bank(s) selected in step 330 and electric vehicle 450. As previously noted, FIG. 4A shows electric vehicle 450 undergoing acceleration 454A. In response to that energy transfer requirement, energy storage system 400 is shown to increase the rate of energy transfer provided to electric vehicle 450 as current $i_M$ along energy transfer path 452. In order to increase the rate of energy transfer during the acceleration depicted in FIG. 4A, energy storage system 400 is shown to selectively utilize main drive energy bank 402 and acceleration energy bank 404, e.g., by discharging those energy cells substantially concurrently. Moreover, because regenerative braking energy bank 406 may not be needed to meet the energy transfer requirement represented by acceleration 454A, regenerative braking energy bank 406 has remained selectively unused, resulting in substantially no current flowing along energy transfer path 416, as shown by the dashed outline of regenerative braking energy bank 406 and the dotted line representation of energy transfer path 416, in FIG. 4A.

As shown in FIG. 3, after completion of step 340 of flowchart 300, steps 320, 330, and 340 may be repeated in response to additional energy transfer requirements. For example, FIG. 4B shows electric vehicle 450 during a regenerative braking operation, which may occur subsequent to the acceleration operation shown in FIG. 4A. Regenerative braking of electric vehicle 450 corresponds to braking deceleration 454B, and may be associated with a rapid transfer of energy from electric vehicle 450 to energy storage system 400, as shown by the double arrowed flow of current $i_M$ into power system 400 along energy transfer path 452. In response to that energy transfer requirement, energy storage system 400 is shown to selectively utilize regenerative braking energy bank 406 by charging regenerative braking energy bank 406 using current $i_3$ and energy transfer path 416. It is noted that because neither main drive energy bank 402 nor acceleration energy bank 404 has been selected for use during regenerative braking, substantially no current flows along either of respective energy transfer paths 412 and 414. Alternatively, where machine 450 corresponds to part of a power system such as a power grid or a power generation system, The operation depicted in FIG. 4B can be seen to correspond to a rapid recharge of energy bank 406 by machine 450, e.g., the power grid or power generation system.

According to one embodiment of the present invention, energy storage system 400 may be configured to transfer energy from at least one energy bank to one or more other energy banks. Referring, for example, to FIG. 4C, FIG. 4C shows a somewhat more complicated power management environment wherein energy is being transferred from energy storage system 400 to electric vehicle 450 during a sustained driving operation, e.g., sustained cruising 454C by electrical vehicle 450, while energy storage system 400 is also transferring energy internally between regenerative braking energy bank 406 and acceleration energy bank 404.

The energy transfer scenario represented in FIG. 4C may be seen as following the events depicted in FIGS. 4A and 4B, for example, and may be understood to represent another iteration of steps 320, 330, and 340. That is to say, after at least partial depletion of acceleration energy bank 404 due to the energy transfer requirement imposed by acceleration 454A, and after the charging of regenerative braking energy bank 406 produced by braking deceleration 454B of electric vehicle 450, regenerative braking energy bank 406 has an energy surplus while acceleration energy bank 404 has an energy deficit. As shown in FIG. 4C, energy storage system 400 can determine the energy transfer requirements corresponding to that energy imbalance, as well as to the energy transfer requirement corresponding to sustained cruising 454C by electric vehicle 450 so as to power electric vehicle 450 using main drive energy bank 402 and substantially concurrently replenish acceleration energy bank 404 using energy stored in regenerative braking energy bank 406.

As may be apparent from FIG. 4C and the foregoing description of energy storage system 400, one advantage of partitioning energy storage between dedicated acceleration energy bank 404 and dedicated regenerative braking energy bank 406 is that charge cycling of both energy banks 404 and 406 can be reduced. That is to say, rather than conventional implementations in which the same battery pack is used both during acceleration, and during braking to absorb regenerative braking energy, the embodiment of FIG. 4C can perform multiple acceleration operations and multiple regenerative braking operations before undergoing charge cycling.

In other words, acceleration energy bank 404 can be consistently, if only periodically, partially discharged during each of a series of accelerations. Analogously, regenerative braking energy bank 406 may be consistently, if only periodically, partially charged during each of a series of regenerative braking events. As a result, charge cycling of acceleration energy bank 404 and regenerative braking energy bank 406 may be limited to those occasions when regenerative braking energy bank 406 is fully or almost fully charged, and/or those occasions when acceleration energy bank 404 becomes significantly depleted, under which circumstances energy is finally discharged from regenerative braking energy bank 406 and charged into acceleration energy bank 404. In such a manner, charge cycling for each of main drive energy bank 402, acceleration energy bank 404, and regenerative braking energy bank 406 may be effectively minimized so as to advantageously extend the usable life of energy storage system 400.

Thus, across a wide variety of possible implementations, embodiments of the present invention enable improved power management through utilization of multiple independently selectable and operable energy banks. By configuring a energy storage system to include a plurality of such energy banks capable of being individually charged and/or discharged, embodiments of the present invention provide an energy storage system that can be rendered more responsive to the performance requirements of the load it supplies. In addition, by enabling the selective use of at least one of a plurality of independently operable energy banks for periodic consistent recharge of energy received from a power system of regenerated by the load, while one or more other energy cells are consistently selected for discharge to the load, embodiments of the present invention provide an energy storage system enabling avoidance of the frequent charge cycling known to contribute to premature battery failure in conventional systems.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. The described embodiments are to be considered in all respects as illustrative and not restrictive. It should also be understood that the invention is not limited to the particular embodiments described herein, but is capable of many rearrangements, modifications, and substitutions without departing from the scope of the invention.

The invention claimed is:

1. An energy storage system comprising:
   a power management system including a plurality of power transfer units;
   a corresponding plurality of energy banks coupled to said power management system, each of said plurality of energy banks capable of being independently discharged through a respective power transfer unit of said power management system;
   a temporary charge storage node of said power management system being coupled to a reference node common to said plurality of power transfer units;
   said power management system configured to select at least one of said plurality of energy banks to transfer energy between said energy storage system and a machine.

2. The energy storage system of claim 1, wherein a rate of energy transfer between said energy storage system and said machine is determined by said energy storage system.

3. The energy storage system of claim 1, wherein a rate of energy transfer between said energy storage system and said machine is increased by said energy storage system during an acceleration operation of said machine.

4. The energy storage system of claim 1, wherein a rate of energy transfer between said energy storage system and said machine is increased by said energy storage system during a period of increased demand by a power system including said machine.

5. The energy storage system of claim 1, wherein a duration of energy transfer between said energy storage system and said machine is determined by said energy storage system.

6. The energy storage system of claim 1, wherein a duration of energy transfer between said energy storage system and said machine is extended by said energy storage system during a sustained operation of said machine.

7. The energy storage system of claim 1, wherein said machine is one of an electric vehicle and a gas/electric hybrid vehicle.

8. The energy storage system of claim 1, wherein said machine comprises a machine implemented as part of one of a utility power grid and a power generation system.

9. The energy storage system of claim 1, wherein said at least one of said plurality of energy banks is configured to receive power from said machine.

10. The energy storage system of claim 1, wherein said at least one of said plurality of energy banks is configured to receive regenerative power from said machine.

11. The energy storage system of claim 1, wherein said plurality of energy banks comprise two or more secondary battery packs.

12. The energy storage system of claim 11, wherein said two or more secondary battery packs have different chemistries.

13. The energy storage system of claim 1, wherein said at least one of said plurality of energy banks comprises one of fuel cells and supercapacitors.

14. The energy storage system of claim 1, wherein said power management system is configured to charge said at least one of said plurality of energy banks while substantially concurrently discharging at least one other of said plurality of energy banks.

15. The energy storage system of claim 1, wherein said power management system is configured to discharge at least two of said plurality of energy banks substantially concurrently.

16. The energy storage system of claim 1, wherein said plurality of energy banks are coupled to said power management system in parallel with one another.

17. The energy storage system of claim 1, wherein said power management system is further configured to transfer energy from at least one of said plurality of energy banks to at least another of said plurality of energy banks.

18. A method for use by an energy storage system for selectively utilizing a plurality of energy banks, said method comprising:
   determining an energy transfer requirement of a machine coupled to said energy storage system;
   selecting at least one of said plurality of energy banks for responding to said energy transfer requirement; and
   transferring energy between said at least one of said plurality of energy banks and said machine according to said determined energy transfer requirement, utilizing a temporary charge storage node of said energy storage system coupled to said plurality of energy banks.

19. The method of claim 18, wherein transferring energy between said at least one of said plurality of energy banks and said machine according to said determined energy transfer requirement comprises at least one of:
   discharging at least two of said plurality of energy banks substantially concurrently; and
   receiving power from said machine.

20. The method of claim 18, further comprising transferring energy from at least one of said plurality of energy banks to at least another of said plurality of energy banks.

* * * * *